Aug. 7, 1951 A. E. KRACH 2,563,121
SPRING FASTENING DEVICE FOR TRIM CHANNELS
Filed July 15, 1947

INVENTOR.
ANTHONY E. KRACH,
BY
Justin W Macklin
ATTY

Patented Aug. 7, 1951

2,563,121

UNITED STATES PATENT OFFICE 2,563,121

SPRING FASTENING DEVICE FOR TRIM CHANNELS

Anthony E. Krach, Cleveland, Ohio, assignor to The Cuyahoga Spring Company

Application July 15, 1947, Serial No. 760,976

3 Claims. (Cl. 24—73)

This invention relates to a snap fastener or spring clip device for securing hollow bead trim or the like to an apertured support, such as the sheet metal of automobile bodies, fenders, furniture, or wall panels.

Its essential objects are to provide a simple, cheaply manufactured spring clip which may be readily and easily installed and which will engage the trim member in such a manner as to hold it firmly.

In the assembling of a spring clip device of this nature with the trim and supporting member, a convenient and efficient practice is to lock the clips at predetermined distances in engagement with the trim member, and then apply the trim member with the clips therein, to the support, causing shank portions of the device to engage correspondingly spaced openings in the support.

It is desirable that the clips may be easily positioned in the trim member and shall maintain an expanding yielding engagement therewith, and as the shank portions are compressed to pass into their openings, it is important that the engagement with the channel shall not be disturbed by materially increasing the outward pressure, or by decreasing its expanding pressure outwardly into the channel sufficiently to cause either distortion or looseness.

The trim channel is preferably made of very light metal, and it is important to avoid distortion of the clip which may distort the metal of the channel, thus impairing its uniform appearance.

More specific objects will become apparent in the following description of a preferred form of my fastening device.

Other advantages attained by the present invention and not possible by previous clips known to me are set forth herein.

Figure 1:
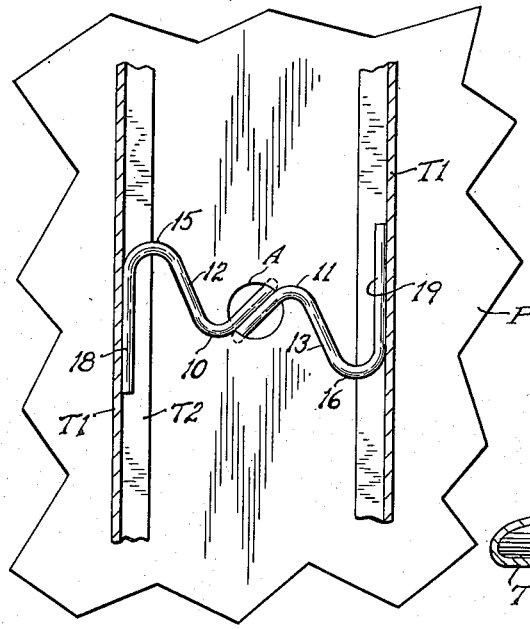
Fig. 1 is a plan view of the clip engaging an opening in the support and engaging the flanges of the channel shown in section.

Describing the construction shown in the drawings by the use of reference characters, a plane member P which may represent the body or fender of an automobile, a wall of a cabinet, or the like, may be provided with a plurality of aligned openings or apertures, usually in the form of punched round holes such as shown at A.

Figure 2:
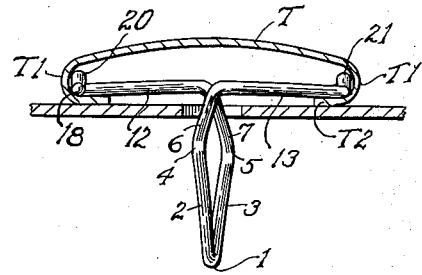
Fig. 2 is a transverse section through the channel and support showing my clip in elevation.

Trim channel of a commonly used form designated T is shown as having rounded sides T1 and inturned flanges T2, the upper or outer portion being curved in a flat arch approximately as shown in Fig. 2.

Fastening devices which may be placed at intervals in engagement with the inside of the channel are then caused to engage the apertures by pressing the channel with the heads of the fasteners held therein toward the plate P and into engagement, as shown in Fig. 2.

A preferred form of fastener according to the present invention comprises a single, preferably round, wire bent midway of its ends, forming a nose 1 and sides 2 and 3 of a narrow loop having knee portions 4 and 5 above which the wires are bent to slope toward each other, as shown at 6 and 7, and then crossing, as shown.

Above or beyond the loop the wire is again bent in a plane at right angles to the plane of the loop and curved in a pair of bends 10 and 11, beyond which the wire extends in approximately parallel arms 12 and 13—one on one side of the loop and the other on the other. These portions 12 and 13 are joined by bends 15 and 16 with the channel-engaging side members 18 and 19. The mid portion of each of the side members 18 and 19 is preferably bent upwardly slightly as indicated at 20 and 21, respectively.

It will be noted that the reverse curved portions connecting the head of the loop with the channel engaging side members form, in effect, S-members approximately in a common plane and one reversed with relation to the other to bring the channel engaging side members in positions approximately opposite each other in a line through the opening and normal to the direction of the channel.

For convenience in further description, the parts of the fastener engaging the flanges and inner sides of the trim channel, and lying on one side of the supporting sheet or plate P are referred to as the head, and the portions designated 1 to 7, inclusive, are referred to as the loop.

Below the knee portions 4 and 5 of the loop, the side portions 2 and 3 are preferably curved inwardly slightly to facilitate the entry into the opening A during the assembly.

The relation of the loop to the head is essentially that the plane of the loop is at right angles to the plane of the head, and also and more particularly the members 2, 3, 6 and 7 lie approximately in a plane which is at an acute angle with relation to the channel-engaging members 18 and 19.

The functioning of the fastener is such that as the sides of the loop are compressed or brought toward each other by engagement with the opening A, the portions 6 and 7 and the bends 10 and 11 tend to move to separate or press outwardly on the arms 12 and 13, and in a direction at an angle such as to be still acting to press outwardly tending to separate the arms 18 and 19. However, the arms 12 and 13 being parallel and on opposite sides of the loop and at substantially right angles to the plane of the loop, and being connected by the bends 10 and 15, and 11 and 16, with the channel-engaging side members 18 and 19, may yieldingly move both with relation to the loop and the side members and thus avoid excessive pressure on the inside of the channel.

Figure 4:
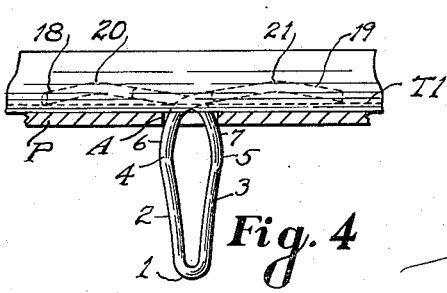
Fig. 4 is a view showing the clip in holding engagement with the support, and showing the adjacent portion of the trim channel in elevation.

Likewise, the bends 10 and 11, and 15 and 16 establish or limit this pressure on the inside of the trim channel, while still permitting the loop to expand into tight engagement with the under edge of the opening A when the fastener and channel are in the position on the plate or sheet P, as shown in Figs. 2 and 4.

Figure 5:
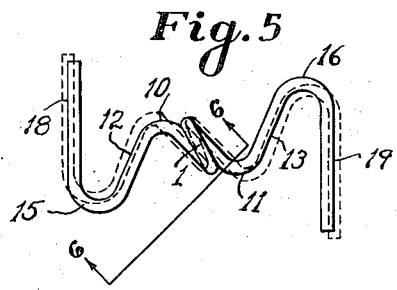
Fig. 5 is a plan view of the clip looking at the nose end of the loop portion and toward the head, and indicating the action of compressing the head by both broken and solid lines.

Referring to Fig. 5, the action of contracting the loop to pass through the opening, which brings the knees and sides of the loop toward each other, will have the effect of pressing outwardly on the head members, and if unrestrained they will assume the positions shown in broken lines in Fig. 5.

Here it will be noted that if the side members 18 and 19 are restrained, as by the trim channel, the bends 10 and 11, and 15 and 16 will however permit the loop to resume its normal position, and thus will permit firm tight engagement of the sloping wedge-acting members 6 and 7 with the under side of the opening.

The curvature of the sides of the trim channel T is usually on a radius larger than that of the wire of which the clips are made, with the result that when clips are sprung or slid into position in engagement with the channel preparatory to assembling the channel and clips in position on the supporting plate, there may be a looseness which may require individually guiding the nose of the clips to the openings. If, however, the engagement of the clips with the flange is such as to establish a firm position normal to the plane of the channel, the assembling may be simplified by allowing a number of these clips to be pressed into a series of openings A either simultaneously or in progressive succession.

The arching or bending of the side members 18 and 19 causes the intermediate portions 20 and 21 of these members to effect such engagement with the inside curve of the edges of the channel as to prevent looseness and tipping of the loop with relation to the channel.

The substantially flat formation of the head with its middle portion being curved downwardly where the wires meet and cross to join the loop, coupled with the firm engagement with these specially shaped side members, prevents the middle portion of the head from springing upwardly and impinging against the trim channel under the influence of forcing the loop through the opening.

Sloping the arms 2 and 3 on a slight inward curve permits the loop to extend a good part of its length into the opening which aids in avoiding bending of the trim channel and facilitates the entry and locking of the loop.

If the loop is connected to the side members such as 18 and 19 of the head without the bends such as 10 and 11, as is usual in the formation of such loops and head gripping members, either of two undesirable results may occur. The engagement of the opening A with the loop may draw the side members out of tight engagement with the trim channel, or the trim channel may press inwardly on the side members and either contract the loop or unduly resist its contraction, depending on the formation.

Therefore, a point of essential novelty of the present invention is that of arranging a loop so that its plane of expansion and contraction is at an oblique angle—preferably midway between a parallel plane and one normal to the side members of the head. The crossing direction of members 6 and 7 and their relative movement is preferably at an angle to the long dimension of the trim channel. This angle may be about forty-five degrees and may vary, say, from thirty to sixty degrees or more.

It will be seen from inspection of Fig. 5 that a relative movement of the sides of the loop may be taken up in the bends 10 and 11, and 15 and 16, and by reason of the angle of movement of the loop sides relative to the side members 18 and 19 and to the long dimension of the trim channel, this movement is in effect along the hypotenuse rather than at right angles, and thus may be greater than the amount which the side members 18 and 19 would move were they not in engagement with the channel.

Conversely, if the size of the opening A permits more than normal expansion of the loop for its latching engagement, this angular direction correspondingly permits a greater loop expansion independently of the confined position of the side members 18 and 19.

Figure 6:
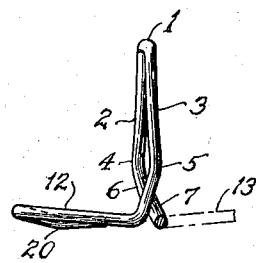
Fig. 6 is a view of a portion of the clip taken on a plane cutting through one arm, as is indicated by the line 6—6 of Fig. 5.

Fig. 6, as stated, is an elevation of a portion of the fastener cut across the head member adjacent the loop and looking in a direction along the narrow side of the loop, that is, approximately in the plane of the loop. In this figure as well as in Fig. 2, it is intended to indicate that the members 12 and 13 are sloped slightly toward the loop which augments the yielding spring action urging the trim toward the supporting plate P.

Figure 3:
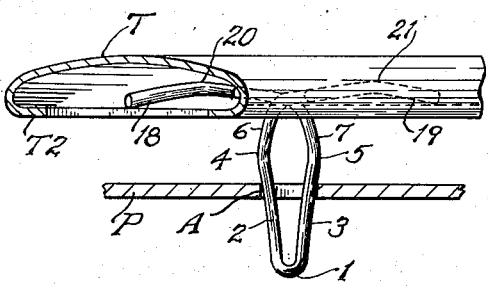
Fig. 3 is a side view showing the clip entering the opening in the support and showing the channel and support sectioned in offset planes.

Fig. 4, like Fig. 3, is a straight side elevation of the loop which, it will be noted, shows the head in broken lines and with the channel at an angle to the plane of the view.

The comparison of Figs. 3 and 4 indicates first the entry of the loop into the opening, and next the gripping or snapped in holding position.

Having thus described my invention, what I claim is:

1. A spring fastener for engaging inturned flanges of trim channel and an opening in a supporting plate to hold the channel thereon, the fastener comprising a single piece of spring wire bent intermediate its ends to form a nose and divergent legs, and crossing portions forming a loop, the wire extending away from the crossing portion in a pair of opposed S-shaped arms in mutually reversed positions terminating in parallel flange engaging sections, the loop being adapted to contract and expand to effect engagement with the opening, and said contracting and expanding movement being in a direction at an acute angle to the channel-engaging sections.

2. A spring fastening device for engaging inturned flanges of trim channel and for engaging an opening in a supporting plate to hold the channel thereon, the fastener comprising a single piece of spring wire bent intermediate its ends to form a loop having a nose portion and divergent legs and crossing portions normally contacting each other, the wire extending away from the crossing portions, and each extension being formed into an S-shaped arm, the adjacent curves of which are in mutually reversed positions and the outer curves of which are likewise mutually reversed and which terminate in parallel channel engaging substantially straight sections, the loop being adapted to contract to enter the openings and to expand to effect holding engagement with the opening, the plane of the loop portion and the direction of expanding movement substantially in said plane being at an acute angle to the parallel channel engaging sections, whereby the resiliency of the S-curves permits movement of the straight sections bodily toward and away from each other while held in parallelism, and the channel engagement resulting in tightening rather than loosening the engagement of the loop with the plate opening.

3. A fastener such as described in claim 2 in which the parallel channel engaging sections are bowed intermediately away from the surface of the flanges engaged thereby effecting contact essentially at the end portions of said sections.

ANTHONY E. KRACH.

REFERENCES CITED

The following references are of record in the file of this patent:

UNITED STATES PATENTS

| Number | Name | Date |
|---|---|---|
| 2,099,189 | Ball | Nov. 16, 1937 |
| 2,124,252 | Lavigne | July 19, 1938 |
| 2,208,008 | McLaughlin | July 16, 1940 |
| 2,221,009 | Van Uum | Nov. 12, 1940 |
| 2,254,310 | Place | Sept. 2, 1941 |
| 2,255,858 | Place | Sept. 16, 1941 |